United States Patent
Kuris et al.

(10) Patent No.: US 12,541,343 B2
(45) Date of Patent: Feb. 3, 2026

(54) MONITORING STYLISTIC PREFERENCES OF SOURCE CODE IN INTEGRATED DEVELOPMENT ENVIRONMENTS

(71) Applicant: Red Hat, Inc., Raleigh, NC (US)

(72) Inventors: Eran Kuris, Holon City (IL); Avraham Avi Talmor, Rishon Leziyon (IL)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 18/098,000

(22) Filed: Jan. 17, 2023

(65) Prior Publication Data

US 2024/0241698 A1 Jul. 18, 2024

(51) Int. Cl.
*G06F 8/30* (2018.01)
*G06F 8/74* (2018.01)

(52) U.S. Cl.
CPC . *G06F 8/31* (2013.01); *G06F 8/74* (2013.01)

(58) Field of Classification Search
CPC ............... G06F 8/31; G06F 8/33; G06F 8/71
See application file for complete search history.

(56) References Cited

U.S. PATENT DOCUMENTS

| | | | |
|---|---|---|---|
| 5,748,975 A | 5/1998 | van De Vanter | |
| 7,117,479 B2 | 10/2006 | van De Vanter | |
| 7,496,889 B2 | 2/2009 | Sutter et al. | |
| 9,052,966 B1 * | 6/2015 | Quinlan | G06F 9/45508 |
| 9,733,933 B1 | 8/2017 | Arquero et al. | |
| 10,459,697 B1 | 10/2019 | Metwally et al. | |
| 11,294,792 B2 * | 4/2022 | Wang | G06F 11/3616 |
| 11,842,174 B2 * | 12/2023 | Ni | G06N 3/0455 |
| 2007/0011654 A1 * | 1/2007 | Opperman | G06F 8/70 717/122 |
| 2009/0037876 A1 | 2/2009 | Meijer et al. | |
| 2012/0311533 A1 * | 12/2012 | Fanning | G06F 8/33 717/111 |
| 2013/0174133 A1 * | 7/2013 | Goetz | G06F 8/36 717/140 |
| 2017/0109139 A1 * | 4/2017 | Bitner | G06F 8/33 |
| 2018/0285084 A1 * | 10/2018 | Mimlitch, III | G06F 8/34 |
| 2020/0057622 A1 * | 2/2020 | Shtein | G06F 8/41 |
| 2021/0256122 A1 * | 8/2021 | Vaithiyanathan | G06F 8/70 |

OTHER PUBLICATIONS

Van De Vanter and Ballance, "Coherent user interfaces for language-based editing systems," Int. J. Man-Machine Studies (1992) 37, 431-466. https://www.sciencedirect.com/science/article/abs/pii/0020737392900045.

* cited by examiner

*Primary Examiner* — Duy Khuong T Nguyen
(74) *Attorney, Agent, or Firm* — Dority & Manning, P.A.

(57) ABSTRACT

Systems and methods for identifying, marking, or modifying source code non-compliant with stylistic preferences in an integrated development environment (IDE). An example method may comprise determining, by a processing device executing an integrated development environment (IDE), a programming language of a source code being processed by the IDE; identifying, from a plurality of style profiles, a style profile for the programming language of the source code; and for each portion of the source code, determining whether a respective portion of the source code complies with the style profile.

17 Claims, 5 Drawing Sheets

```
┌─────────────────────────────────────────────────────────────────────────┐
│ Determine, by a processing device executing an integrated development    │
│ environment (IDE), a programming language of a source code being        │
│ processed by the IDE                                                    │
│                                                                          │
│                                    210                                   │
└─────────────────────────────────────────────────────────────────────────┘
                                     │
                                     ▼
┌─────────────────────────────────────────────────────────────────────────┐
│ Identify, from a plurality of style profiles, a style profile for the   │
│ programming language of the source code                                  │
│                                                                          │
│                                    220                                   │
└─────────────────────────────────────────────────────────────────────────┘
                                     │
                                     ▼
┌─────────────────────────────────────────────────────────────────────────┐
│ For each portion of the source code, determine whether a respective     │
│ portion of the source code complies with the style profile.             │
│                                                                          │
│                                    230                                   │
└─────────────────────────────────────────────────────────────────────────┘
```

Identify a style profile for a programming language of a source code being processed by the IDE

310

For each portion of the source code, determine whether a respective portion of the source code complies with the style profile

320

Mark the respective portion of the source code that does not comply with the style profile.

| Identify a style profile for a programming language of a source code being processed by the IDE |
|---|
| 410 |

↓

| For each portion of the source code, determine whether a respective portion of the source code complies with the style profile |
|---|
| 420 |

↓

| Modify the respective portion of the source code that does not comply with the style profile to comply with the style profile. |
|---|
| 430 |

MONITORING STYLISTIC PREFERENCES OF SOURCE CODE IN INTEGRATED DEVELOPMENT ENVIRONMENTS

TECHNICAL FIELD

The disclosure is generally related to integrated development environments (IDEs), and more particularly, to identifying, marking, or modifying source code non-compliant with stylistic preferences in an integrated development environment (IDE).

BACKGROUND

An integrated development environment (IDE) provides programmers with a set of tools that assist in the development and/or management of software programs. For example, an IDE can provide editing and/or debugging software for programmers. The IDE supports software development by providing a windowed system for source file editing, project management, file interdependency management, and debugging. As another example, IDE can assist in the management of source files and binary files, program compiling, source file editing, and similar tasks associated with software development. Some IDEs may be structured as plug-in-based software models where the components of the IDE are structured as plug-ins for the IDE.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are systems and methods to identify, mark, and/or modify source code non-compliant with stylistic preferences in the IDE.

During software development, continuous integration is the practice of merging software developers' working copies of source code for an application into a shared mainline code base, generally, several times a day. With continuous integration, each software developer submits source code for the application being developed on a daily (or more frequent) basis, and a set of operations referred to herein as a build process ("build") is performed to produce executable code (for an application) from the source code. The executable code may be for an application, for example. The build may include compiling source code files to produce the executable code for an application, performing tests on the executable code, and deploying the executable code. The build may be performed periodically or with each (significant) source code change.

Gating, an operation performed during the build, performs various extensive testing to ensure the quality of the working copies of source code being merged into the shared mainline code base. In some instances, the working copies of the source code may fail gating due to typographical errors, such as white spaces. Typically, these typographical errors, which failed gating, are not indications of errors in the actual source code but rather the quality of the source code. Accordingly, these typographical errors will likely not affect the build. While identifying typographical errors is important to ensure the quality of the code, gating tends to utilize a lot of computing resources.

Aspect of the disclosure addresses the above and other deficiencies by providing technology that identifies, marks, and/or modifies source code containing these typographical errors. In particular, addressing the typographical errors prior to continuous integration used to merge software developers' working copies of source code into the shared mainline code base.

In an illustrative example, a style profile is used to identify typographical errors within the source code. The style profile defines a set of stylistic rules for a programming language or version of the programming language used to develop the source code. Each stylistic rule of the style profile provides a style preference that dictates quantity and specific usage of white spaces, empty lines, and/or specific characters (or collection of characters). The style profile may be auto-generated or manually generated for each programming language and/or version of the programming language.

Additionally, and/or alternatively, a user style profile may be used to further identify typographical errors within the source code irrespective of the programming language and version of the programming language. Accordingly, the user style profile defines a set of stylistic rules for a software developer.

During the development of the source code, the source code is analyzed for syntax that fails to comply with the stylistic rules of the style profile and/or user style profile. For example, the source code is analyzed to determine whether any portion of the source code fails to match the style profile and/or user style profile, such as, a mismatch in the quantity of white spaces, empty lines, and/or specific characters or improper usage of white spaces, empty lines, and/or specific characters.

Each portion of the source code that does not comply with the style profile and/or user style profile (e.g., a non-compliant portion of the source code) is emphasized by marking the non-compliant portion of the source code (e.g., underlining and/or highlighting). In some embodiments, a list of non-compliant portions of source code that violated stylistic rules of the style profile and/or user style profile may be generated and provided to the software developer. Each non-compliant portion of the source code in the list may also indicate which stylistic rule of the style profile and/or user style profile was violated.

Suggestions may be provided to indicate a modification that may transform the non-compliant portion of the source code to source code compliant with the style profile and/or user style profile. In some embodiments, the non-compliant portion of the source code may be auto-corrected to source code compliant with the style profile and/or user style profile.

Therefore, the systems and methods described herein include technology that provides a more efficient and less resource-heavy means for monitoring typographical errors prior to build continuous integration of source code to a shared mainline code base. Various aspects of the above referenced methods and systems are described in detail herein below by way of examples, rather than by way of limitations.

Figure 1:
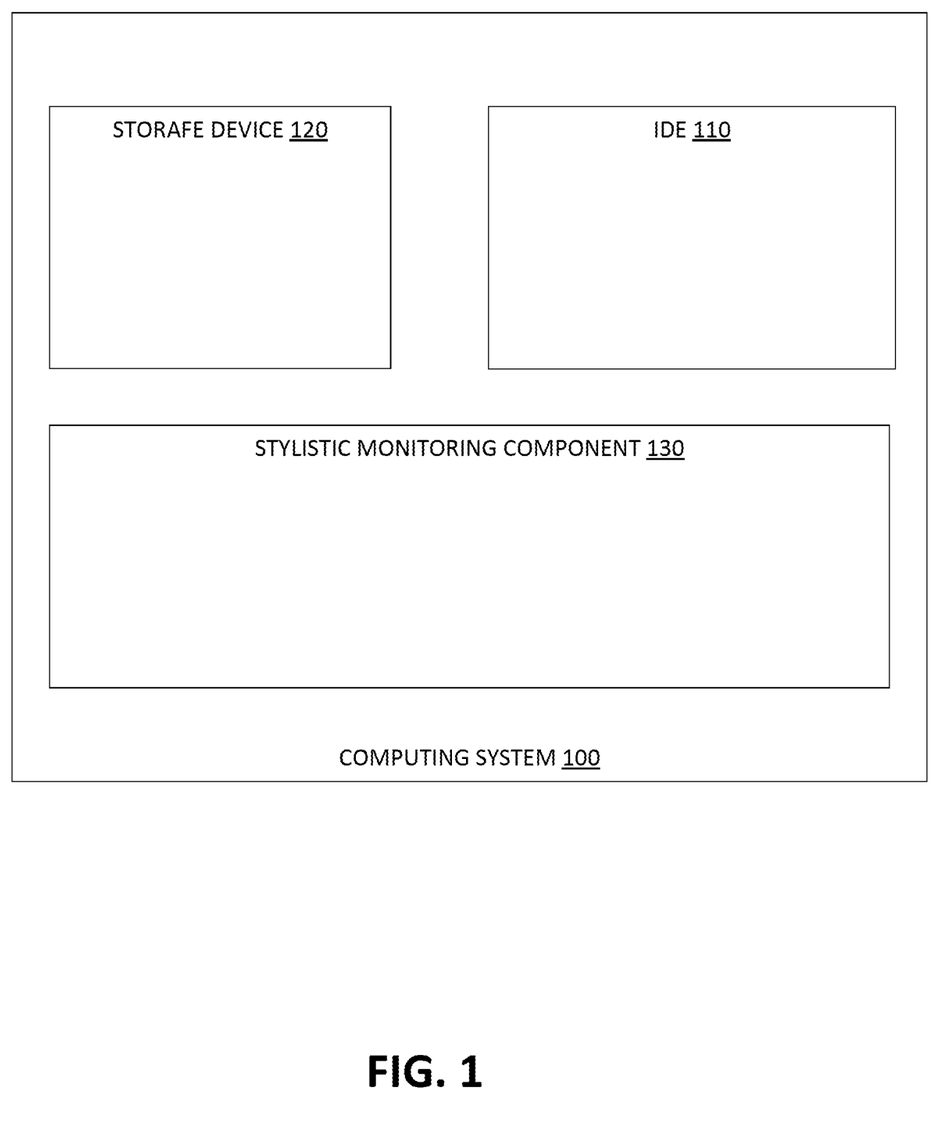
FIG. 1 depicts a block diagram of an example computer system, in accordance with one or more aspects of the disclosure.

FIG. 1 is a diagram of one embodiment of an example computer system 100, in accordance with some embodiments. The computer system 100 can include at least one processing device (not shown) and at least one storage device (not shown) implementing an integrated development environment (IDE) 110. The computer system 110 can be any type of computing device, including a desktop computer, a workstation, a dedicated server, a handheld device, or a similar computing device. The computer system 110 may include any type and number of processing devices. For example, one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The IDE 110 refers to an application that provides software developers with various functionality for software development (e.g., developing and/or managing software programming projects). The IDE 110 can include a source code editor, build automation tools, and a debugger.

The source code editor is a text editor module (or software) designed specifically to edit computer programs' source code. In some embodiments, the source code editor may simplify and speed up typing of source code, such as syntax highlighting, indentation, autocomplete and bracket matching functionality. Typically, source code editors simplify and speed up the typing of source code based on the syntax of a programming language. Syntax of the programming language defines a set of rules dictating the combinations of symbols (e.g., character set) that are considered to be correctly structured statements or expressions in that programming language. The source code editor may store the source code as a source code file.

The build automation tool is a module (or software) that compiles the source code to machine code. During compilation by the build automation tool, the source code may be examined for syntax errors. Syntax error is an error in the syntax of the source code that is intended to be written in a particular programming language. Syntax errors can include misspellings, missing letters, missing characters, etc. Syntax errors found in the source code are unable to be converted into machine code. In instances where no syntax errors are detected, the build automation tool automates the process of software build creation and other related processes like packaging binary code (or files) and running the automated tests.

The debugger (or debugging tool) is a module (or software) that tests and debugs the software build by running the software build under controlled conditions that permit the software developer to track its execution and monitor changes in computer resources that may indicate malfunctioning code.

The storage device 120 may include any type and number of storage devices. For example, the storage device can be a fixed disk drive, removable storage medium drive that is an external drive or internal drive, random access memory (RAM), static memory or similar storage device, etc. The storage device can be used to store data files that are part of a programming project managed by IDE 110. The data files can include source code files, binary files, and files for the IDE 110.

The computer system 100 may further include external tools (e.g., plug-ins or add-ons) used to further customize the functionality of the IDE 110 and their various modules (e.g., source code editor, build automation tool, and debugger). For example, the external tool may be a stylistic monitoring component 130. The stylistic monitoring component 130 may include one or more style profiles for each programming language (e.g., Java, Ansible, Python, etc.). In some embodiments, the stylistic monitoring component 130 may include one or more style profiles for each version of a specified programming language (e.g., Java SE 17, Java SE 18, Java SE 19, etc.).

Style profiles define a set of stylistic rules for the programming language and/or a version of the programming language. Each stylistic rule of the set of stylistic rules defines a stylistic preference for the syntax of source code programmed in the designated programming language and/or version of the programming language. In other words, the stylistic rule is a rule that would not otherwise generate a syntax error when the build automation tool examines the source code for syntax errors.

In some embodiments, a stylistic rule may include a style preference that dictates a predetermined number of white spaces to be included in the source code in a specified manner. For example, the style preference of the stylistic rule may dictate that the predetermined number of white spaces must be included before, after, or between specific lines, operators, functions, and/or characters. Additionally, and/or alternatively, the style preference of the stylistic rule may dictate that no white spaces should be included before, after, or between specific operators, functions, and/or characters. Depending on the embodiment, the style preference of the stylistic rule may define a definition of a white space. Accordingly, the stylistic rule may assist in verifying whether a white space within the source code is a white space as defined by the stylistic rule.

In some embodiments, a stylistic rule may include a style preference dictating a predetermined number of empty lines to be included in the source code in a specified manner. For example, the style preference of the stylistic rule may dictate that the predetermined number of empty lines must be included before, after, or between lines of written source code. Additionally, and/or alternatively, the style preference of the stylistic rule may dictate that the predetermined number of empty lines must be included before, after, or between other elements of the source code (e.g., functions). Depending on the embodiment, the style preference of the stylistic rule may define a definition of an empty line. Accordingly, the stylistic rule may assist in verifying whether an empty line within the source code is an empty line as defined by the stylistic rule.

In some embodiments, a stylistic rule may include a style preference dictating specific characters that may be included in the source code. The style preference of the stylistic rule may further define a specific manner in which the specific characters may be used within the source code. Additionally, and/or alternatively, the style preference of the stylistic rule may dictate specific characters that are not to be included in the source code. Depending on the embodiment, the specific character may be a collection of characters (e.g., words, alphanumeric phrases, etc.). In some embodiments, based on the style preference of the stylistic rule dictating specific collection of characters to be used, the stylistic monitoring component 130 may generate a comprehensive collection of incorrect versions (e.g., misspelled versions) of the specific collection of characters to be added to the style profile. Accordingly, the stylistic rule may assist in verifying the correct use of characters or collection of characters (e.g., words). In particular, to identify misuse of characters and misspellings of collection of characters (e.g., words) as defined by the stylistic rule.

In some embodiments, a style profile may be created for a programming language or a version of a specific programming language. In particular, the programming language or the version of the programming language is selected for a new style profile. The selected programming language or version of the programming language is assigned to (or associated with) the new style profile. Thus, the new style profile can only be applied to the programming language or version of the programming language. One or more style preferences may be further selected for the new style profile from a list of style preferences (e.g., white space, empty line, and character preferences). Based on the selection, the one or more style preferences may be stored to the new style profile.

In some embodiments, style profiles may be auto-generated based on preset preferences associated with the selected programming language or version of the specific programming language. For example, the preset preferences may be based on best practices for the selected programming language or version of the specific programming language, known bugs of the selected programming language or version of the programming language, etc. In some embodiments, the preset preferences may be based on a previous source code version. For example, the previous version of the source code may dictate preferences necessary to maintain the quality of the next version of the source code, or uniformity from version to version of the source code.

In some embodiments, an existing style profile may be selected and copied to a new style profile for a different programming language or a different version of the programming language of the existing style profile.

Depending on the embodiment, the stylistic monitoring component 130 may further include one or more user style profiles. The user style profiles are similar to the style profiles. However, the user style profiles in contrast to the style profiles, include a set of stylistic rules for the software developer irrespective of the programming language and/or version of the programming language. Accordingly, the set of stylistic rules should be used on (or applied to) all programming languages and/or versions of programming languages.

In operations, the stylistic monitoring component 130 may be implemented into the IDE 110. The stylistic monitoring component 130 identifies the programming language of the source code being edited in the text editor module of the IDE 110. In some embodiments, identifying the programming language of the source code may include analyzing the syntax of the source code to conclude the programming language and/or version of the programming language used to generate the source code. In some embodiments, the stylistic monitoring component 130 may identify the programming language and/or version of the programming language based on other aspects of the IDE 110 and/or text editor module of the IDE 110. For example, the libraries implemented in the source code, the configuration of the IDE 110, etc.

The stylistic monitoring component 130, based on the identified programming language, may identify a style profile to be used to analyze the source code being edited in the text editor module. In some embodiments, the software developer may select a user style profile to be used in lieu of or in addition to the style profile to analyze the source code being edited in the text editor module. In some embodiments, during the creation, editing, or completion of source code by the software developer in the text editor module of the IDE 110, the stylistic monitoring component 130 identifies portions of the source code that does not comply with the identified style profile and/or user style profile. Based on its analysis of the source code, the stylistic monitoring component 130 determines whether or not the source code complies with the style profile and/or the user style profile by determining whether or not the portion of the source code matches the style profile and/or user style profile, i.e., the number of white spaces, empty lines, and/or specific characters (or collections of characters) do not exist and/or are not used as specified in the style profile.

As a result of the portion of the source code not complying with the style profile and/or user style profile (e.g., a non-compliant portion of the source code), the stylistic monitoring component 130 may emphasize the non-compliant portion of the source code. The stylistic monitoring component 130 may emphasize the non-compliant portion of the source code by marking the non-compliant portion of the source code in the text editor module of the IDE 110. Marking the non-compliant portion of the source code in the text editor module of the IDE 110 may include highlighting or underlining the non-compliant portion of the source code. For example, underlining and/or highlighting the non-compliant portion of the source code in a manner (e.g., unique color) indicating that the error is associated with violating the style profile rather than a syntax error (via the build automation tool).

Depending on the embodiment, rather than marking the portion of the source code in the text editor of the IDE 110, the stylistic monitoring component 130 may generate a list of non-compliant portions of source code that violated stylistic rules of the style profile and/or user style profile. In some embodiments, each non-compliant portion of the source code may indicate which stylistic rule of the style profile and/or user style profile was violated.

The stylistic monitoring component 130 may provide suggestions for modifying the non-compliant portion of the source code to comply with the style profile and/or user style profile. Thus, software developer may choose to accept or deny the suggested modification. In some embodiments, the stylistic monitoring component 130 may automatically modify the non-compliant portion of the source code to comply with the style profile and/or user style profile. Accordingly, the software developer may choose to revert the non-compliant portion of the source code back to how the non-compliant portion of the source code was presented before the automatic modification.

Depending on the embodiment, the stylistic monitoring component 130 may provide the build automation tool of the IDE 110 with the steps necessary to identify, mark, and modify non-compliant portions of the source code. Accordingly, the above-identified steps with respect to the stylistic monitoring component 130 are performed by the build automation tool of the IDE 110.

Further details regarding the stylistic monitoring component 130 will be described in further detail below with reference to FIGS. 2-4.

In further embodiments, the stylistic monitoring component 130 can be integrated into a monolithic plug-in with other external tools or directly integrated into the IDE 110. Other permutations of these configurations are also within the scope of the invention. External tools may include, but are not limited to, an email program or real-time communication program to facilitate communication of source code, continuous integration and continuous deployment (CI/CD) system to perform CI/CD builds, deployment program to deploy source code to a container of a container platform system, code quality program to analyze the quality of the code, etc.

For simplicity of explanation, the methods of this disclosure are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

Figure 2:
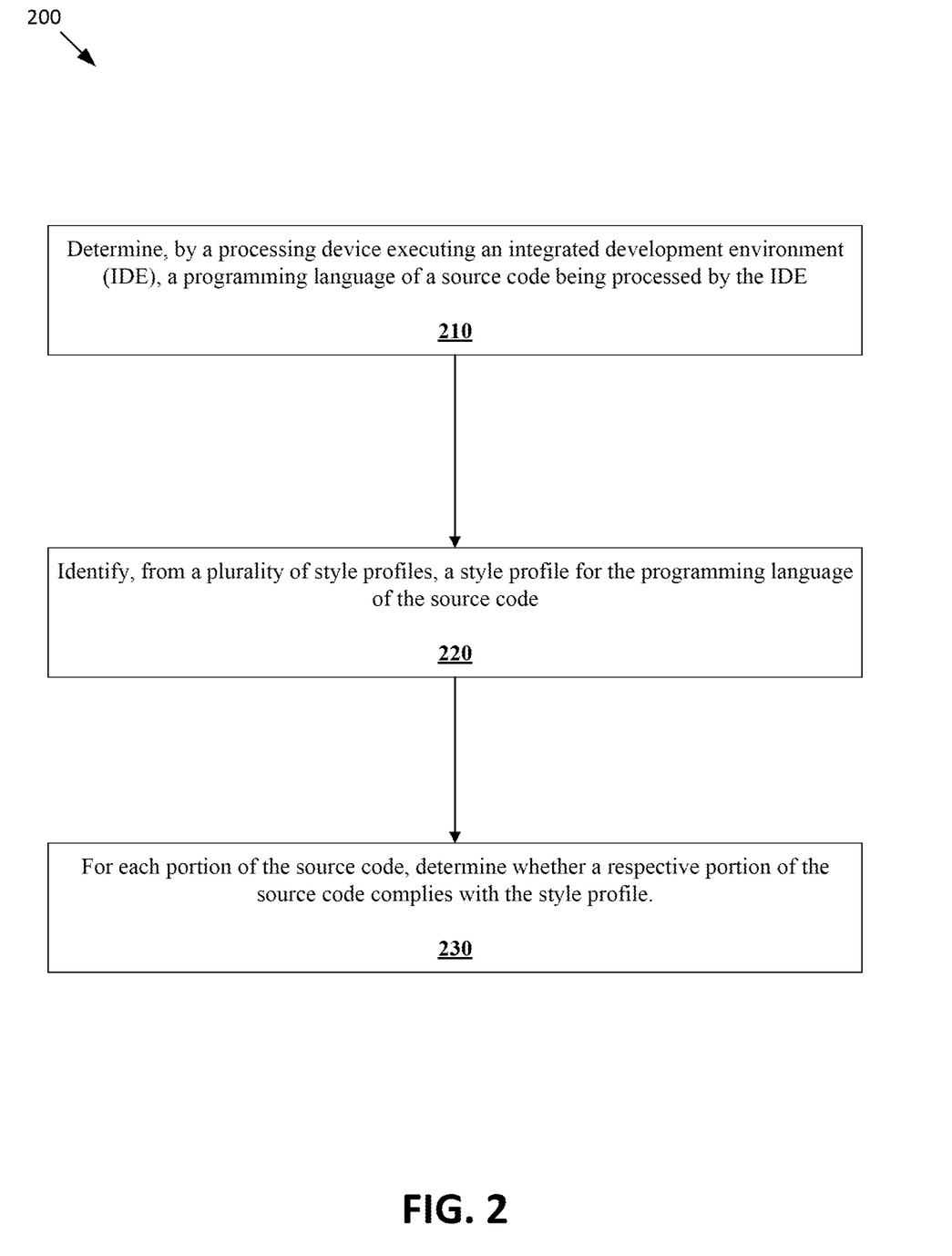
FIG. 2 depicts a flow diagram of an example method for identifying source code non-compliant with stylistic preferences in an integrated development environment (IDE), in accordance with some embodiments.

FIG. 2 depicts a flow diagram of an example method 200 for identifying source code non-compliant with stylistic preferences in an IDE, in accordance with one or more aspects of the present disclosure. The method may be performed by processing logic that may comprise hardware (circuitry, dedicated logic, etc.), computer readable instructions (run on a general-purpose computer system or a dedicated machine), or a combination of both. In an illustrative example, method 200 may be performed by a stylistic monitoring component, such as the stylistic monitoring component 130 of FIG. 1. Alternatively, some or all of method 200 might be performed by another module or machine. It should be noted that blocks depicted in FIG. 2 could be performed simultaneously or in a different order than that depicted.

At block 210, the processing logic determines a programming language of a source code being processed by an integrated development environment (IDE). As previously described, the processing device may identify the programming language of the source code being edited in the text editor module of the IDE 110 by analyzing the syntax of the source code. In embodiments, by analyzing other aspects of the IDE 110 and/or text editor module of the IDE 110 (e.g., the libraries or the configuration files of the IDE 110).

At block 220, the processing logic identifies, from a plurality of style profiles, a style profile for the programming language of the source code. Each style profile of the plurality of style profiles corresponds to one of a programming language or a version of a programming language. The style profile includes a set of stylistic rules. Each stylistic rule refers to a rule that defines the use of at least one of white spaces, empty lines, special characters, or predetermined characters in the source code. Depending on the embodiment, as previously described, a user style profile may be used in conjunction with or in lieu of the style profile.

At block 230, for each portion of the source code, the processing logic determines whether a respective portion of the source code complies with the style profile. As previously described, the processing device determines that the respective portion of the source code does not comply with the style profile by determining that the portion of the source code does not match the style profile. In other words, there are not sufficient white spaces, empty lines, or specific characters (or collections of characters) to meet the requirement for the style profile, as specified by the style profile.

Responsive to determining that the respective portion of the source code does not comply with the style profile, the processing logic marks the respective portion of the source code. Marking the respective portion of the source code includes highlighting the respective portion or underlining the respective portion in the IDE. As previously described, the respective portion of the source code (e.g., a non-compliant portion of the source code) can be highlighted and/or underlined in a manner (e.g., unique color) which indicates that the error is associated with violating the style profile rather than a syntax error (via the build automation tool). In other embodiments, a list of non-compliant portions of source code that violated stylistic rules of the style profile may be generated.

Depending on the embodiment, the processing logic modifies the respective portion of the source code to comply with the style profile. As previously described, the processing device suggests modifications to the non-compliant portion of the source code to adhere to the style profile. In other embodiments, the processing device may automatically modify the non-compliant portion of the source code to adhere to the style profile.

Figure 3:
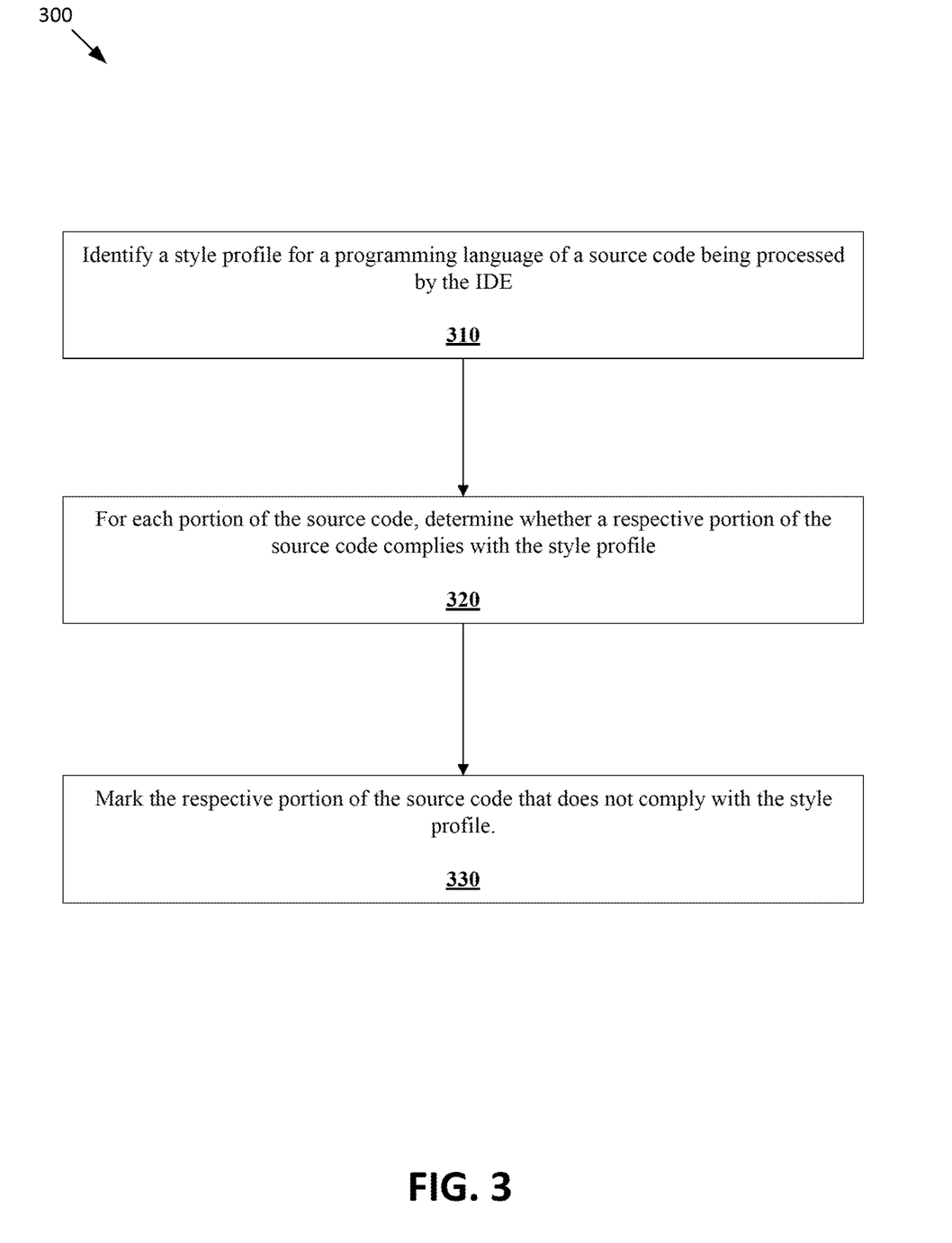
FIG. 3 depicts a flow diagram of an example method for marking source code non-compliant with stylistic preferences in the IDE, in accordance with some embodiments.

FIG. 3 depicts a flow diagram of an example method 300 for marking source code non-compliant with stylistic preferences in the IDE, in accordance with one or more aspects of the present disclosure. The method may be performed by processing logic that may comprise hardware (circuitry, dedicated logic, etc.), computer readable instructions (run on a general-purpose computer system or a dedicated machine), or a combination of both. In an illustrative example, method 300 may be performed by a stylistic monitoring component, such as the stylistic monitoring component 130 of FIG. 1. Alternatively, some or all of method 300 might be performed by another module or machine. It should be noted that blocks depicted in FIG. 3 could be performed simultaneously or in a different order than that depicted.

At block 310, the processing logic identifies a style profile for a programming language of a source code being processed by the IDE. As previously described, the processing device may identify the programming language of the source code being edited in the text editor module of the IDE 110 by analyzing the syntax of the source code. In embodiments, by analyzing other aspects of the IDE 110 and/or text editor module of the IDE 110 (e.g., the libraries or the configuration files of the IDE 110).

The processing logic identifies, from a plurality of style profiles, the style profile for the identified programming language of the source code. Each style profile of the plurality of style profiles corresponds to one of a programming language or a version of a programming language. The style profile includes a set of stylistic rules. Each stylistic rule refers to a rule that defines the use of at least one of white spaces, empty lines, special characters, or predetermined characters in the source code. Depending on the embodiment, as previously described, a user style profile may be used in conjunction with or in lieu of the style profile.

At block 320, for each portion of the source code, the processing logic determines whether a respective portion of the source code complies with the style profile. As previously described, the processing device determines that the respective portion of the source code does not comply with the style profile by determining that the portion of the source code does not match the style profile. In other words, there are not sufficient white spaces, empty lines, or specific characters (or collections of characters) to meet the requirement for the style profile, as specified by the style profile.

At block 330, the processing logic marks the respective portion of the source code that does not comply with the style profile. As previously described, responsive to determining that the respective portion of the source code does not comply with the style profile, the processing logic marks the respective portion of the source code. Marking the respective portion of the source code includes highlighting the respective portion or underlining the respective portion in the IDE. As previously described, the respective portion of the source code (e.g., a non-compliant portion of the source code) can be highlighted and/or underlined in a manner (e.g., unique color) which indicates that the error is associated with violating the style profile rather than a syntax error (via the build automation tool). In other embodiments, a list of non-compliant portions of source code that violated stylistic rules of the style profile may be generated.

Depending on the embodiment, the processing logic modifies the respective portion of the source code to comply with the style profile. As previously described, the processing device suggests modifications to the non-compliant portion of the source code to adhere to the style profile. In other embodiments, the processing device may automatically modify the non-compliant portion of the source code to adhere to the style profile.

Figure 4:
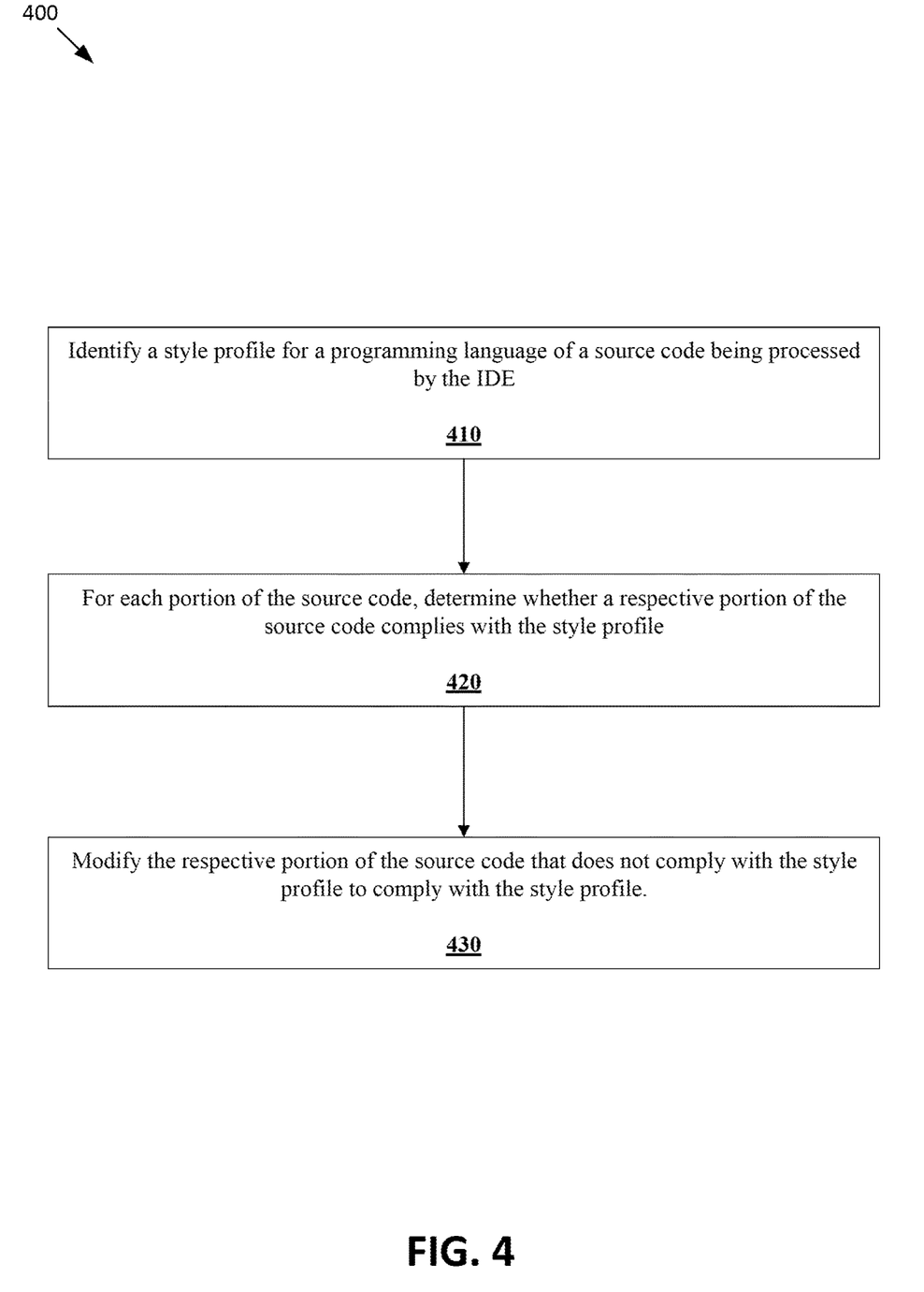
FIG. 4 depicts a flow diagram of an example method for modifying source code non-compliant with stylistic preferences in the IDE, in accordance with some embodiments.

FIG. 4 depicts a flow diagram of an example method 400 for modifying source code non-compliant with stylistic preferences in the IDE, in accordance with one or more aspects of the present disclosure. The method may be performed by processing logic that may comprise hardware (circuitry, dedicated logic, etc.), computer readable instructions (run on a general-purpose computer system or a dedicated machine), or a combination of both. In an illustrative example, method 400 may be performed by a stylistic monitoring component, such as the stylistic monitoring component 130 of FIG. 1. Alternatively, some or all of method 400 might be performed by another module or machine. It should be noted that blocks depicted in FIG. 4 could be performed simultaneously or in a different order than that depicted.

At block 410, the processing logic identifies a style profile for a programming language of a source code being processed by the IDE. As previously described, the processing device may identify the programming language of the source code being edited in the text editor module of the IDE 110 by analyzing the syntax of the source code. In embodiments, by analyzing other aspects of the IDE 110 and/or text editor module of the IDE 110 (e.g., the libraries or the configuration files of the IDE 110).

The processing logic identifies, from a plurality of style profiles, the style profile for the identified programming language of the source code. Each style profile of the plurality of style profiles corresponds to one of a programming language or a version of a programming language. The style profile includes a set of stylistic rules. Each stylistic rule refers to a rule that defines the use of at least one of white spaces, empty lines, special characters, or predetermined characters in the source code. Depending on the embodiment, as previously described, a user style profile may be used in conjunction with or in lieu of the style profile.

At block 420, for each portion of the source code, the processing logic determines whether a respective portion of the source code complies with the style profile. As previously described, the processing device determines that the respective portion of the source code does not comply with the style profile by determining that the portion of the source code does not match the style profile. In other words, there are not sufficient white spaces, empty lines, or specific characters (or collections of characters) to meet the requirement for the style profile, as specified by the style profile.

At block 430, the processing logic modifies the respective portion of the source code that does not comply with the style profile to comply with the style profile. As previously described, responsive to determining that the respective portion of the source code does not comply with the style profile, the processing device provides suggestions for modifying the non-compliant portion of the source code to adhere to the style profile. In other embodiments, the processing device may automatically modify the non-compliant portion of the source code to comply with the style profile.

Responsive to determining that the respective portion of the source code does not comply with the style profile, the processing logic marks the respective portion of the source code. Marking the respective portion of the source code includes highlighting the respective portion or underlining the respective portion in the IDE As previously described, the respective portion of the source code (e.g., a non-compliant portion of the source code) can be highlighted and/or underlined in a manner (e.g., unique color) which indicates that the error is associated with violating the style profile rather than a syntax error (via the build automation tool). In other embodiments, a list of non-compliant portions of source code that violated stylistic rules of the style profile may be generated.

Figure 5:
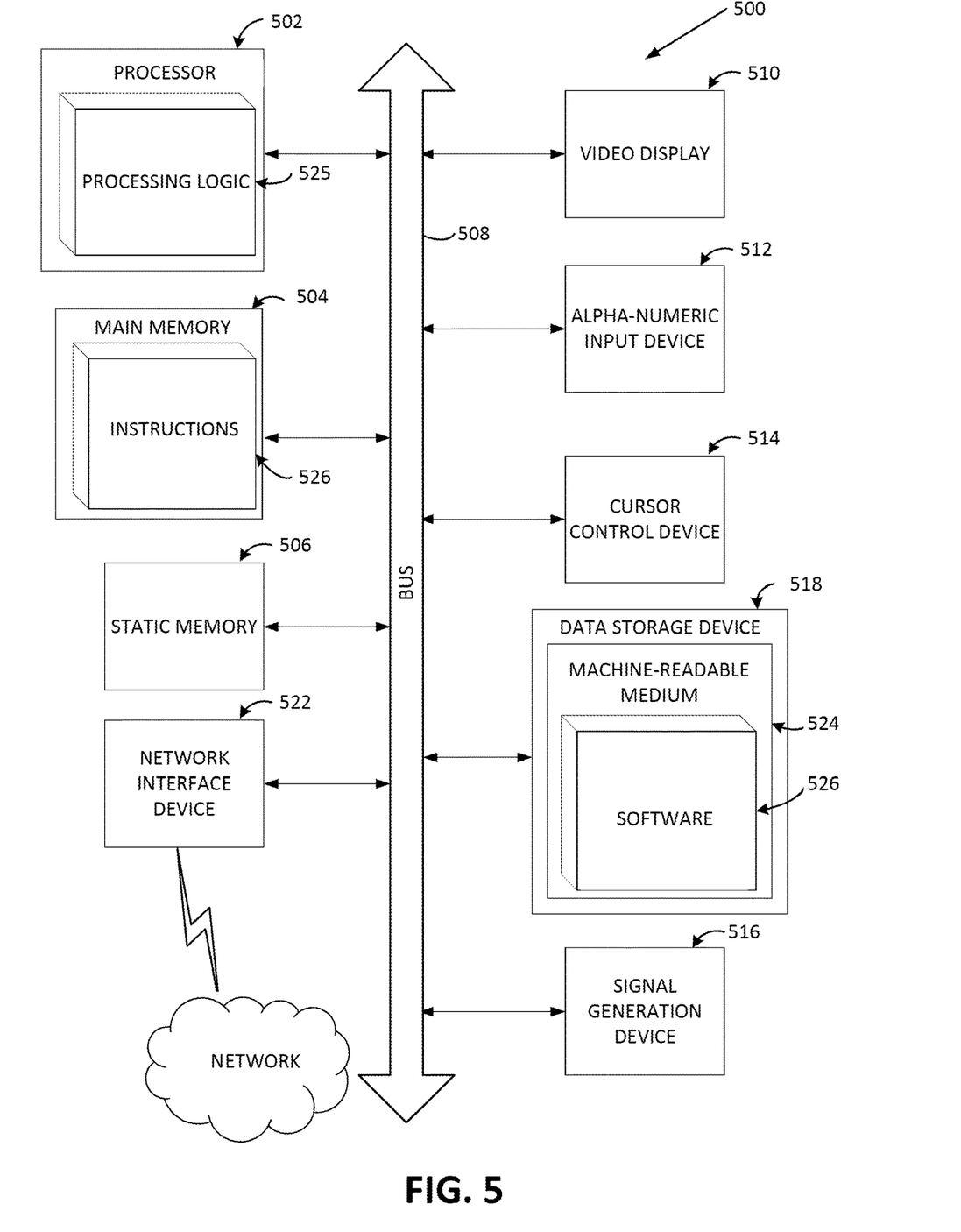
FIG. 5 depicts a block diagram of an illustrative computing device operating in accordance with the examples of the disclosure.

FIG. 5 depicts a block diagram of a computer system operating in accordance with one or more aspects of the present disclosure. In various illustrative examples, computer system 500 may correspond to computer system 100 of FIG. 1. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 and 500.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200 of FIG. 2, 300 of FIG. 3, and 400 of FIG. 4 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining, by a processing device executing an integrated development environment (IDE), a programming language of a source code being processed by the IDE, wherein determining the programming language further comprises determining a version of the programming language;
   identifying, from a plurality of style profiles, a style profile for the version of the programming language of the source code comprising:
      a set of language-specific syntax rules that define a use of characters for the source code; and
      a set of language-agnostic stylistic rules that define stylistic preferences for the source code;
   for each portion of the source code, determining whether a respective portion of the source code complies with the style profile;

responsive to determining that a first portion of the source code fails to comply with the style profile, modifying the first portion of the source code to comply with the style profile; and responsive to modifying the first portion of the source code to comply with the style profile, providing the source code for integration in a code base associated with the source code.

2. The method of claim 1, wherein each style profile of the plurality of style profiles corresponds to one of: a programming language or a version of a programming language.

3. The method of claim 1, wherein the set of language-specific syntax rules comprises a rule that defines the use of at least one of: white spaces, empty lines, special characters, or predetermined characters in the source code.

4. The method of claim 1, wherein the method comprises, responsive to determining that the first portion of the source code does not comply with the style profile, marking the first portion of the source code.

5. The method of claim 4, wherein marking the first portion of the source code includes highlighting the first portion or underlining the first portion in the IDE.

6. The method of claim 1, wherein the set of language-agnostic stylistic rules defines a collection of incorrect versions of collections of characters.

7. The method of claim 6, wherein modifying the first portion of the source code to comply with the style profile comprises:

determining that the first portion of the source code includes an incorrect version of a particular collection of characters included in the source code;

determining that the set of language-agnostic stylistic rules does not define the incorrect version of the particular collection of characters; and modifying the set of language-agnostic stylistic rules to add the incorrect version of the particular collection of characters.

8. The method of claim 1, wherein modifying the first portion of the source code to comply with the style profile comprises:

determining whether the first portion of the source code fails to comply with the set of language-specific syntax rules and/or the set of language-agnostic stylistic rules.

9. The method of claim 8, wherein modifying the first portion of the source code to comply with the style profile further comprises:

marking, in the IDE, the first portion of the source code with a particular color, the particular color selected based on whether the first portion of the source code fails to comply with the set of language-specific syntax rules, the set of language-agnostic stylistic rules, or both the set of language-specific syntax rules and the set of language-agnostic stylistic rules.

10. A system comprising:

a memory device; and a processing device executing an integrated development environment (IDE), operatively coupled with the memory device, to perform operations comprising:

determining a programming language of a source code being processed by the IDE, wherein determining the programming language further comprises determining a version of the programming language;

identifying a style profile for the version of the programming language of the source code, wherein the style profile comprises:

a set of language-specific syntax rules that define a use of characters for the source code; and a set of language-agnostic stylistic rules that define stylistic preferences for the source code;

for each portion of the source code, determining whether a respective portion of the source code complies with the style profile;

responsive to determining that a first portion of the source code fails to comply with the style profile, modifying the first portion of the source code to comply with the style profile; and responsive to modifying the first portion of the source code to comply with the style profile, providing the source code for integration in a code base associated with the source code.

11. The system of claim 10, wherein, prior to modifying the first portion of the source code, the operations comprise:

responsive to determining that the first portion of the source code fails to comply with the style profile, marking the first portion of the source code.

12. The system of claim 10, wherein the style profile is one of a plurality of style profiles.

13. The system of claim 10, wherein the set of language-specific syntax rules comprises a rule that defines the use of at least one of: white spaces, empty lines, special characters, or predetermined characters in the source code.

14. A non-transitory computer-readable storage medium comprising instructions that, when executed by a processing device executing an integrated development environment (IDE), cause the processing device to perform operations comprising:

determining a programming language of a source code being processed by the IDE, wherein determining the programming language further comprises determining a version of the programming language;

identifying a style profile for the version of the programming language of the source code, the style profile comprising:

a set of language-specific syntax rules that define a use of characters for the source code; and a set of language-agnostic stylistic rules that define stylistic preferences for the source code;

for each portion of the source code, determining whether a respective portion of the source code complies with the style profile;

responsive to determining that a first portion of the source code fails to comply with the style profile, modifying the first portion of the source code to comply with the style profile; and responsive to modifying the first portion of the source code to comply with the style profile, providing the source code for integration in a code base associated with the source code.

15. The non-transitory computer-readable storage medium according to claim 14, wherein, prior to modifying the first portion of the source code, the processing device performs operations comprising:

marking the first portion of the source code.

16. The non-transitory computer-readable storage medium according to claim 14, wherein the style profile is one of a plurality of style profiles.

17. The non-transitory computer-readable storage medium according to claim 14, wherein the set of language-specific syntax rules comprises a rule that defines the use of at least one of: white spaces, empty lines, special characters, or predetermined characters in the source code.

\* \* \* \* \*